(12) United States Patent
Priborsky (10) Patent No.: US 7,885,282 B2
(45) Date of Patent: Feb. 8, 2011

(54) DYNAMIC CONTROL OF PHYSICAL LAYER QUALITY ON A SERIAL BUS

(75) Inventor: Anthony L Priborsky, Lyons, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 1732 days.

(21) Appl. No.: 10/626,467

(22) Filed: Jul. 24, 2003

(65) Prior Publication Data
US 2005/0017756 A1    Jan. 27, 2005

(51) Int. Cl.
*H04J 3/12* (2006.01)
*H03K 19/094* (2006.01)
*G06F 13/12* (2006.01)

(52) U.S. Cl. .................... 370/419; 370/527; 326/82; 710/74

(58) Field of Classification Search ......... 370/241–254, 370/493–527, 419–458; 375/221–229; 326/33–82, 326/86–87; 709/204–224, 227–250; 713/300–323; 710/65–71
See application file for complete search history.

(56) References Cited

U.S. PATENT DOCUMENTS

| | | | |
|---|---|---|---|
| 4,564,934 A | 1/1986 | Macchi | |
| 4,621,356 A | 11/1986 | Scipione | |
| 4,811,421 A | 3/1989 | Havel | |
| 4,907,186 A * | 3/1990 | Racey | 710/57 |
| 5,396,519 A * | 3/1995 | Betts et al. | 375/296 |
| 5,455,918 A * | 10/1995 | Fowler et al. | 710/5 |
| 5,457,813 A | 10/1995 | Poutanen | |
| 5,499,338 A * | 3/1996 | Gercekci et al. | 714/25 |
| 6,380,873 B1 | 4/2002 | Priborsky | |
| 6,560,200 B1 * | 5/2003 | Shinozuka | 370/241 |
| 6,703,865 B2 * | 3/2004 | Chan | 326/82 |
| 6,725,327 B1 * | 4/2004 | Espeseth et al. | 711/112 |
| 6,829,663 B1 * | 12/2004 | Ghaffari et al. | 710/71 |
| 6,833,734 B2 * | 12/2004 | Chan | 326/82 |
| 7,010,711 B2 * | 3/2006 | Bashford et al. | 713/323 |
| 7,028,199 B2 * | 4/2006 | Ayyavu et al. | 713/323 |
| 7,328,356 B2 * | 2/2008 | Igari | 713/320 |
| 2003/0021053 A1 | 1/2003 | Sakai | |
| 2003/0086398 A1 | 5/2003 | Hiltunen | |
| 2004/0010625 A1 * | 1/2004 | Lo et al. | 709/250 |
| 2004/0196873 A1 * | 10/2004 | Barkaro | 370/527 |
| 2004/0252716 A1 * | 12/2004 | Nemazie | 370/447 |
| 2005/0138441 A1 * | 6/2005 | Huffman et al. | 713/300 |
| 2005/0186832 A1 * | 8/2005 | Nemazie | 439/378 |
| 2005/0237971 A1 * | 10/2005 | Skraparlis | 370/329 |
| 2005/0251588 A1 * | 11/2005 | Hoch et al. | 710/5 |
| 2007/0058705 A1 * | 3/2007 | Wang et al. | 375/222 |
| 2007/0230480 A1 * | 10/2007 | Ikeda et al. | 370/395.52 |

* cited by examiner

*Primary Examiner*—M. Phan
(74) *Attorney, Agent, or Firm*—Alan G. Rego; Westman, Champlin & Kelly, P.A.

(57) ABSTRACT

A control system controls a physical layer quality of user data transmitted between first and second ends of a serial bus. The control system comprises a first line driver that has a control input that controls the physical layer quality at the first end. A physical layer quality sensor senses the physical layer quality at the second end and generates control primitives that are fed back over the serial bus to the control input to provide closed loop control of the physical layer quality.

18 Claims, 7 Drawing Sheets

DYNAMIC CONTROL OF PHYSICAL LAYER QUALITY ON A SERIAL BUS

FIELD OF THE INVENTION

The present invention relates generally to serial communications over a channel with non-ideal physical layer properties, and more particularly but not by limitation to serial communications between a storage device and a host computer system.

BACKGROUND OF THE INVENTION

In computer systems, functional devices such as disc drives and disc drive controllers in a host computer system are typically connected by transceivers to a transmission line and various connectors that serve as a serial bus. The transmission line, which can be copper conductors or glass fibers, typically has discontinuities at connectors and is not ideal. In the case of copper conductors, there are often impedance discontinuities at connectors and the characteristic impedance of the serial bus typically does not match the impedances at the transceivers. The physical layer characteristics of the data is distorted by impedance discontinuities and mismatch. Performance of the serial bus will vary depending on the uncontrolled length, routing and connectors of the transmission line, leading to reduced bus speed or increased error rates.

A method and apparatus are needed to control and correct the quality of physical layer properties, such as amplitude and frequency rolloff, in such non-ideal arrangements of serial buses. Embodiments of the present invention provide solutions to these and other problems, and offer other advantages over the prior art.

SUMMARY OF THE INVENTION

Disclosed is a control system that controls a physical layer quality of user data transmitted between first and second ends of a serial bus. The control system comprises a first line driver that transmits user data and primitives at the first end. The first line driver has a control input that controls the physical layer quality at the first end.

A physical layer quality sensor senses the physical layer quality at the second end and generates a sensed quality output. A comparator compares the sensed quality output to a quality standard. The comparator generates control primitives representative of a difference between the quality standard and the sensed quality output.

A second line driver at the second end of the serial bus transmits the control primitives at the second end. A first line receiver at the first end receives the control primitives.

A controller couples to the first line receiver and generates a control output as a function of the control primitives. The control output feeds forward to the control input to provide closed loop control of the physical layer quality.

Other features and benefits that characterize embodiments of the present invention will be apparent upon reading the following detailed description and review of the associated drawings.

DETAILED DESCRIPTION OF ILLUSTRATIVE EMBODIMENTS

In serial communications, a communication protocol is used to format user data for transmission over a serial bus and also used to recover user data from formatted messages received from the serial bus.

The communication protocol typically includes multiple layers. Protocols such as the open standards interconnection (OSI) protocol, the serial ATA protocol and fiber channel (FC) protocol, for example, can include as many as seven layers that include a physical layer, a data link layer, a network layer, a transport layer, a session layer, a presentation layer and an applications layer. The so-called physical layer of a serial protocol is the layer that deals directly with the physical communication medium, in other words, the serial bus itself. Physical layer definitions typically include physical parameters such as current or voltage amplitude levels, frequency characteristics, and transmission line impedance matching characteristics. When a serial bus is idle and no data is being transmitted, so-called "sync primitives" are transmitted to maintain synchronization of the transmitter and receiver. "Sync primitives" include no user data, but are transmitted in order to maintain synchronized operation of various layers of the communication protocol.

In the arrangements presently disclosed, control primitives that include data representing sensed physical layer quality are transmitted from a receiver end of a serial bus to control a transmitted physical layer quality at a transmitter end of the serial bus.

Figure 2A:
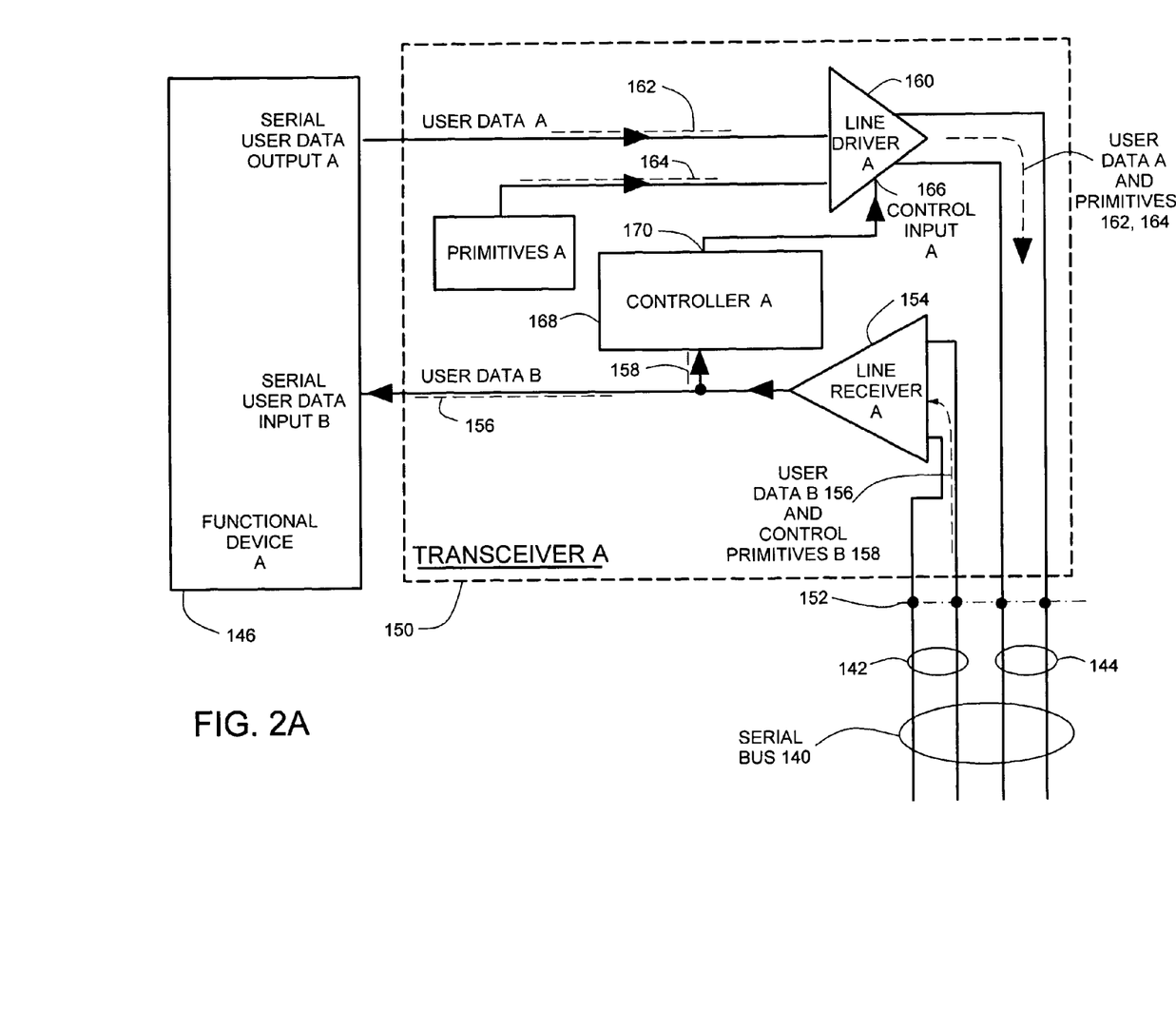
FIG. 2A illustrates a transceiver that controls a physical layer quality of transmitted data.
Figure 2B:
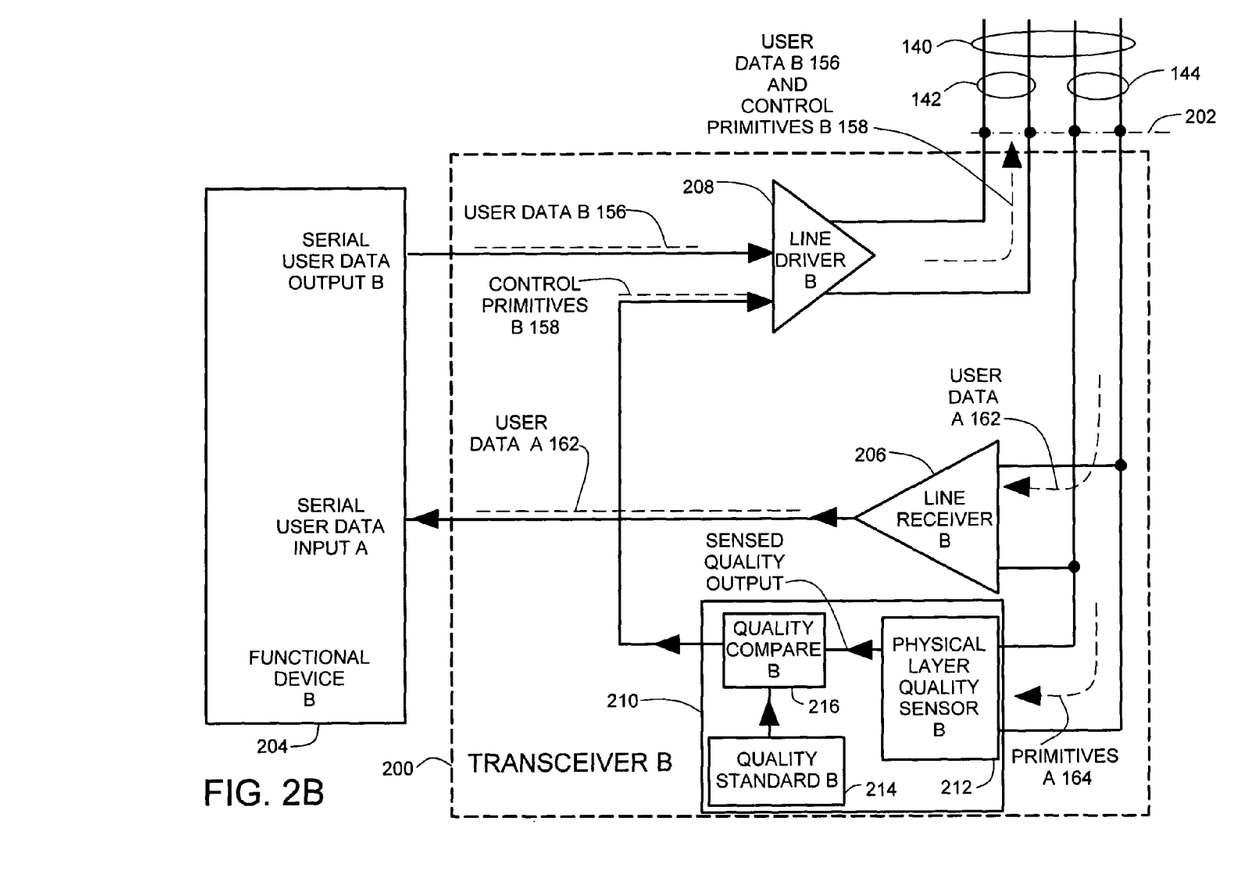
FIG. 2B illustrates a transceiver that senses a physical layer quality of received data.

In one arrangement shown in FIGS. 2A-2B, a first transceiver (transceiver A) transmits primitives over a serial bus to a second transceiver (transceiver B). The second transceiver (transceiver B) includes a physical layer quality sensor that senses one or more physical layer qualities of the received primitives. The second transceiver compares the sensed physical layer quality to a quality standard and generates a "control primitive" that is sent back over the serial bus to the first transceiver. The first transceiver includes a controller that controls the physical layer quality of the first transceiver's transmissions, including control of physical layer quality of both primitives and user data transmissions. The arrangement works as a closed loop control system to adjust a physical layer quality of the first transceiver's transmissions such that the received physical layer characteristics at the second transceiver are adjusted to the quality standard. The control primitive is similar to a sync primitive in that it does not include user data. The control primitive does, however, include data indicating a comparison of received quality to a quality standard. If desired, the control primitives can also include non-repetitive portions to suppress RFI emissions as described in U.S. Pat. No. 6,380,873 Priborsky et al.

The distortion of transmitted data is corrected by the physical layer quality control system. The correction automatically takes into account loading that depends on the total transmission path properties including line length and connectors found in a particular installation. The adjustments are made dynamically in real time so that variations due to environment conditions such as temperature and humidity can also be corrected. The speed of the bus is maintained at a high level and error rates are reduced. The quality of physical layer properties such as impedance discontinuities, amplitude and frequency rolloff is automatically corrected.

Figure 5A:
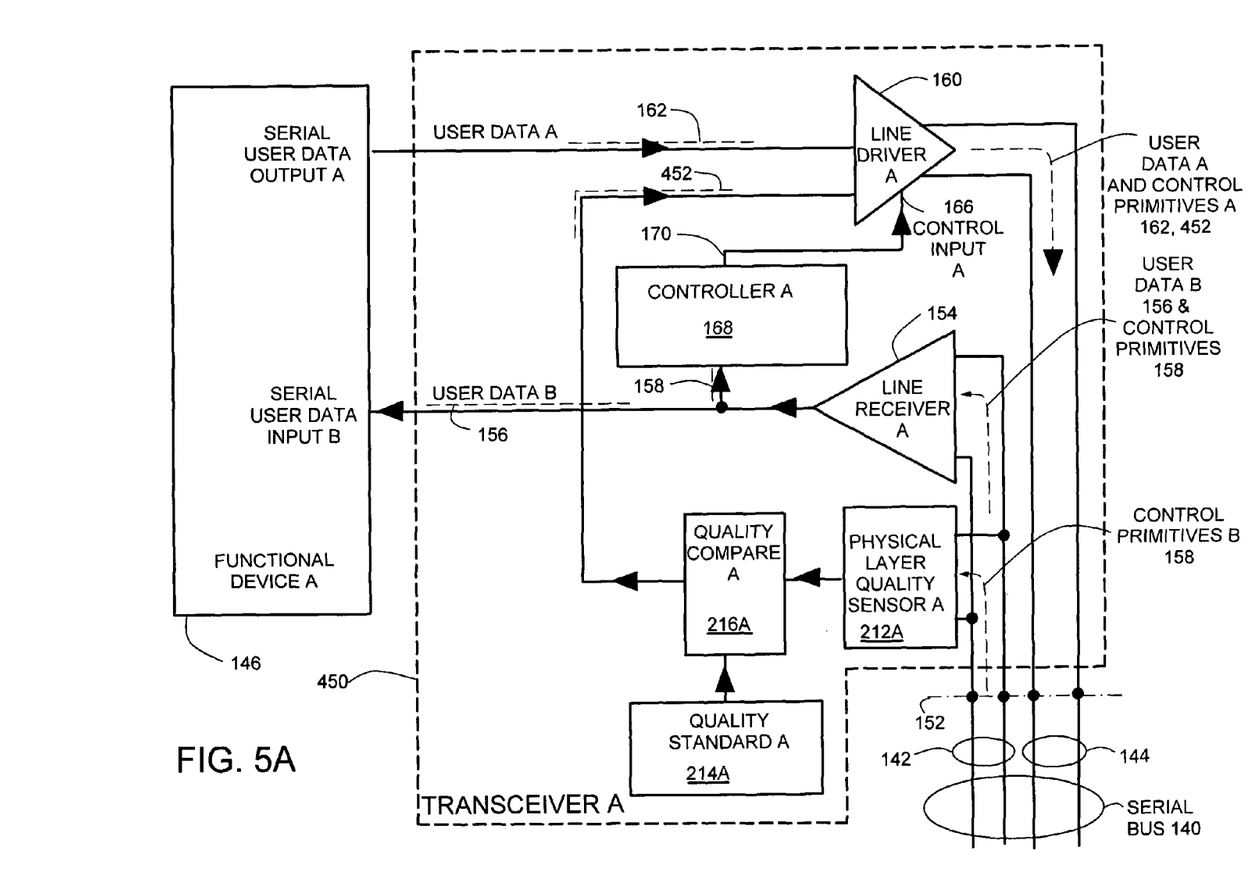
FIG. 5A illustrates a first transceiver that controls a physical layer quality of transmitted data and that also senses a physical layer quality of received data.
Figure 5B:
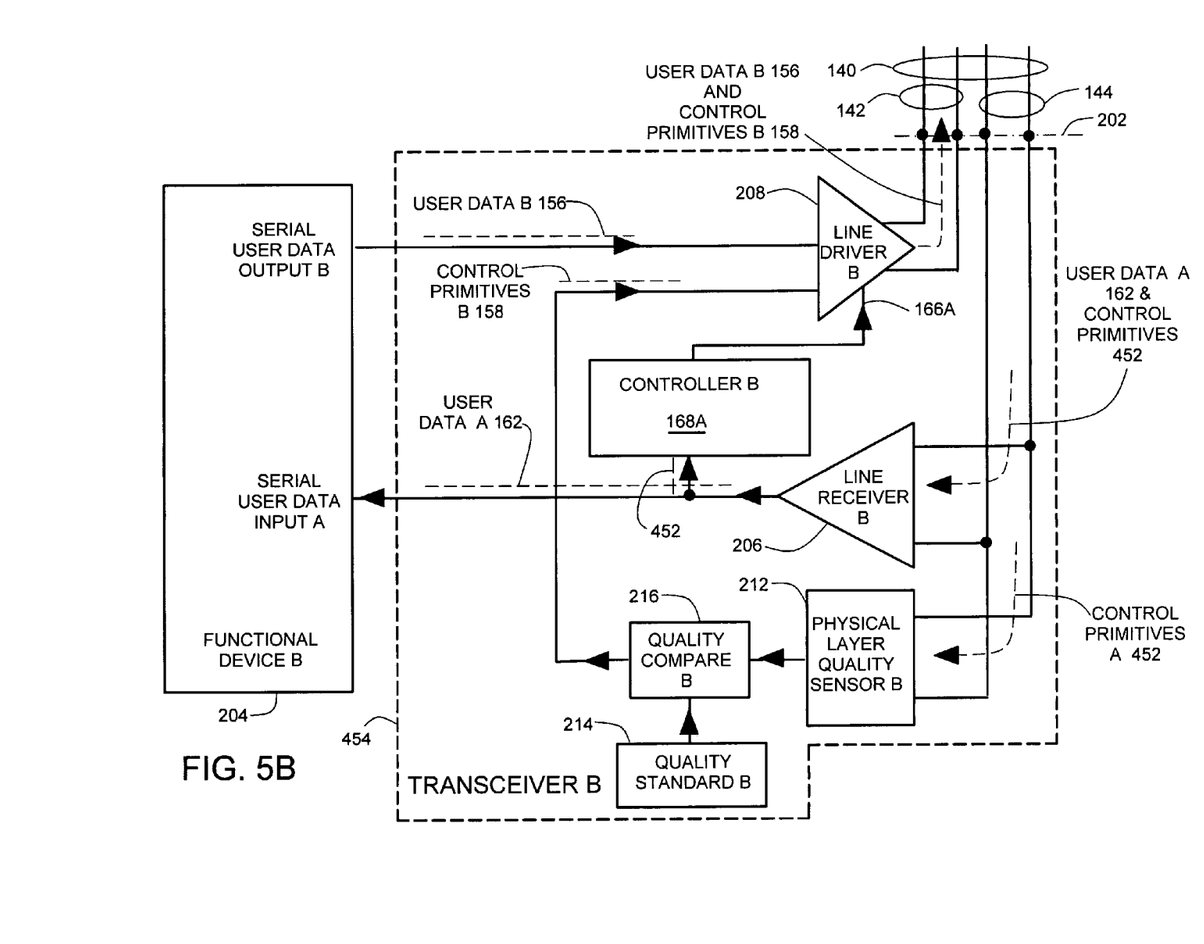
FIG. 5B illustrates a second transceiver that controls a physical layer quality of transmitted data and that also senses a physical layer quality of received data.

Another arrangement shown in FIGS. 5A-5B includes closed loop feedback for both directions of transmission over the serial bus. The disclosed arrangement can be applied generally to serial buses, including a Serial ATA bus, a SAS bus and a fiber channel bus. The disclosed arrangement can optimize the physical layer in situations where the serial bus is functioning, but functioning sub-optimally. Examples are described in more detail below in connections with the Figures.

Figure 1:
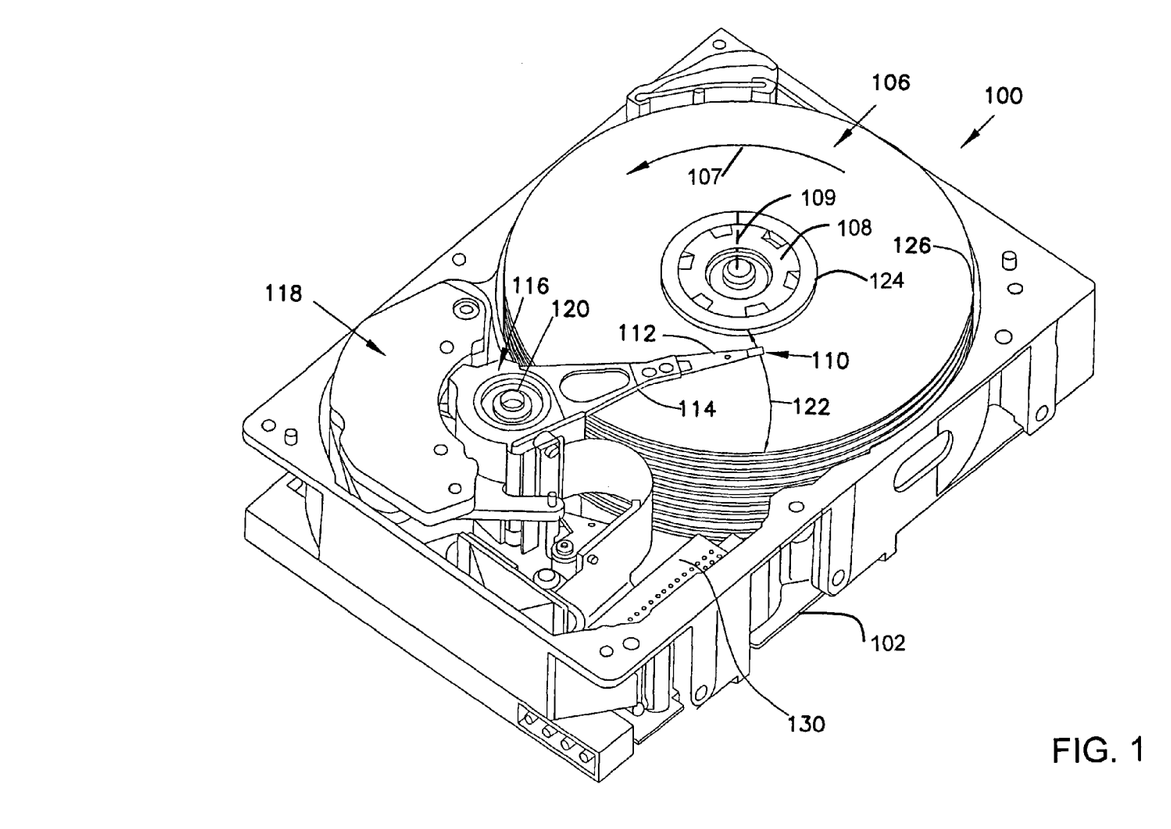
FIG. 1 illustrates an oblique view of a disc drive.

FIG. 1 illustrates an oblique view of a disc drive 100 in which embodiments of the present invention are useful for communication with a host system. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction indicated by arrow 107 about central axis 109. Each disc surface has an associated disc read/write head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached read/write heads 110 about a pivot shaft 120 to position read/write heads 110 over a desired data track along an arcuate path 122 between a disc inner diameter 124 and a disc outer diameter 126. Voice coil motor 118 is driven by electronics 130 based on signals generated by read/write heads 110 and a host computer (not shown). Electronics 130 also includes a transceiver that communicates with the host computer. Examples of such transceiver are described in more detail below in connection with examples illustrated in FIGS. 2A-2B, 3,4 and 5A-5B.

FIG. 2A illustrates a first transceiver 150 (also called transceiver A) that controls a physical layer quality of transmitted data. FIG. 2B illustrates a second transceiver 200 (also called transceiver B) that senses a physical layer quality of received data. FIGS. 2A-2B are best understood when joined together with a bottom edge of FIG. 2A aligned with a top edge of FIG. 2B to form a block diagram of the first transceiver 150 coupled by a serial bus 140 to second transceiver 200.

The serial bus 140 preferably comprises a first pair of copper conductors 142 and a second pair of copper conductors 144. Each of the pairs of conductors 142, 143 is also a serial bus. The first pair of conductors 142 couples data and control primitives from the second transceiver 200 to the first transceiver 150. The second pair of conductors 144 couples data and primitives from the first transceiver 150 to the second transceiver 200. Depending on the particular communication protocol implemented, the serial bus 140 can alternatively comprise only a single pair of conductors which provides bi-directional communication. The physical length of the serial bus 140 can vary depending on the particular physical installation arrangement of transceivers 150, 200 chosen by the end user.

The first transceiver 150 couples a first functional device 146 to the serial bus 140 at a first serial bus end 152. The second transceiver 200 couples a second functional device 204 to the serial bus 140 at a second serial bus end 202. the serial bus 140 extends between the first end 152 and the second end 202. In one preferred arrangement, the first functional device 146 is a storage device, such as a disc drive, that has the transceiver 150 mounted in it, and the second functional device 204 is a host computer system.

The first transceiver 150 comprises a first line receiver 154 that receives second serial data 156 (also called serial data B) and second control primitives 158 (also called control primitives B) over the serial bus 140 from the second transceiver 200. The second control primitives 158 include data that represents a physical layer quality sensed at the second transceiver 200. The first transceiver 150 also comprises a first line driver 160. The first line driver 160 receives first serial data 162 from the first functional device 146 and provides the first serial data 162 to the serial bus 140. The first transceiver 150 also generates sync primitives 164 that are coupled to the serial bus 140. The first line driver 160 has a first transmitted physical layer quality that is controllable by a first control input 166 of the line driver 160. It will be understood by those skilled in the art that the line driver 160 formats the user data 162 and the primitives 164 with the layers of the communications protocol before the user data 162 and primitives 164 are transmitted to the serial bus 140. It will also be understood by those skilled in the art that the line receiver 154 strips the received data 156 and control primitives 158 of the layers of the communication protocol before the received data 156 is passed on to the functional device 146 and the control primitives 158 are passed on to a first controller 168 in the first transceiver 150.

The first controller 168 receives the second control primitives 158 from the first line receiver 154. The first controller 168 provides a control output 170 that couples to the first control input 166 to control the transmitted physical layer quality at the first line driver 160 as a function of the sensed physical layer quality at the second transceiver 200. In preferred embodiments, the first controller 168 controls the sensed physical layer quality in real time and dynamically calibrates the sensed physical layer quality.

In one preferred arrangement, the transmitted physical layer quality includes a signal amplitude of the received sync primitives at the second end 202. When the transmitted physical layer quality includes a signal amplitude, the control input 166 preferably includes a gain control input that adjusts transmitted signal amplitudes at the output of the first line driver 160. In a further preferred arrangement, the transmitted physical layer quality also includes pre-emphasis. When the transmitted physical layer quality includes pre-emphasis, the control input 166 preferably comprises a frequency rolloff input that controls frequency selective filtering of the output of the first line driver 160. The transmitted physical layer quality can include both amplitude and pre-emphasis.

In preferred arrangement, the functional device 146 is a storage device, such as a disc drive, and the transceiver 150 is mounted in the storage device, while the second functional device 204 is a host computer system and the second transceiver 200 is mounted in the host computer system. Depending on the physical arrangement, the length of the serial bus 140 may be very short or extend over a long cable length.

The second transceiver 200 couples the second functional device 204 to the serial bus 140 at the second end 202. The second transceiver 200 comprises a second line receiver 206 receiving the first serial data 162 over the serial bus 140 from the first transceiver 150.

The second transceiver 200 comprises a second line driver 208 receiving the second serial data 156 from the second functional device 204 and providing the second serial data 156 to the serial bus 140. A second quality sensing circuit 210 senses a physical layer quality of the received primitives 164. the second quality sensing circuit 210 generates the second control primitives 158 representing the received physical layer quality. The second control primitives 158 couple to the second line driver 208 for transmission over the serial bus 140 to control the transmitted physical layer quality at the first transceiver 150. In a preferred arrangement, the second control primitives 158 are generated in real time.

In a further preferred arrangement, the second quality sensing circuit 210 comprises a physical layer quality sensor 212 sensing the received first primitives 164, a quality standard 214, and a quality comparator circuit 216 comparing the received first primitive 164 to the quality standard 214 and providing the second control primitives 158. In a preferred arrangement, the second control primitives 164 include an indication of amplitude, an indication of frequency rolloff, or both. In another preferred arrangement, the second transceiver 200 can be mounted in a storage system, such as a disc drive, and can couple the storage device to a host computer system, or vice versa.

The physical layer quality sensor 212 is configured to sense one or more physical layer qualities. When received amplitude is a controlled physical layer quality, the physical quality sensor 212 senses received amplitudes of user data or primitives or preferably both, and the controller 168 (FIG. 2A) controls a transmitted amplitude of both the primitives 164 and the user data 162. When received risetime or overshoot is a controlled physical layer quality, the physical quality sensor senses received waveshapes of leading or trailing edges, and the controller 168 (FIG. 2A) controls transmitted pre-emphasis of both the primitives 164 and the user data 162. Both amplitude and pre-emphasis can be controlled, or other physical layer qualities can be controlled, depending on the needs of the application.

Figure 3:
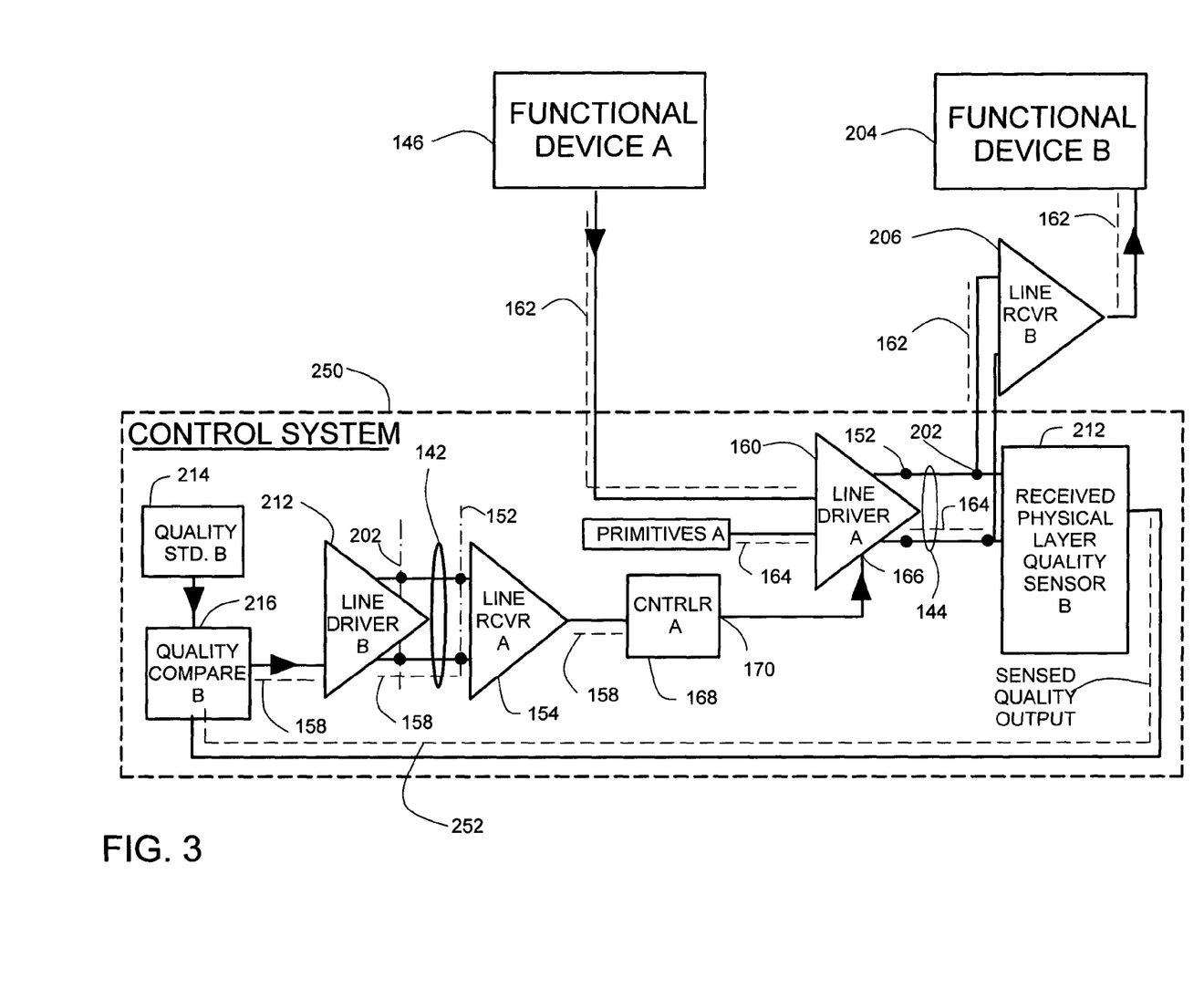
FIG. 3 illustrates a control system for controlling physical layer quality.

FIG. 3 illustrates a control system 250 for controlling physical layer quality.

The control system 250 illustrated in FIG. 3 is comparable to the arrangement of two transceivers illustrated in FIGS. 2A-2B. While FIGS. 2A-2B better illustrate the physical arrangement in two separate transceivers, FIG. 3 better illustrates control system aspects. Features in FIG. 3 that have the same reference numbers as features in FIG. 2A-2B are the same as or similar to the corresponding feature in FIGS. 2A-2B. The control system 250 has a set point (quality standard B at 214), a feedback of a sensed variable (sensed quality output 252) to be controlled and a summing junction (quality compare at 216) providing an error signal (control primitive 158) to a controller (controller 168). The control primitives pass along conductor pair 142 from line driver 212 to line receiver 154. The line driver 212 encodes the control primitives with the layers of the protocol, and the line receiver decodes or removes the layers of the protocol. The controller 168 provides a control output 170 that couples to an input 166 of a "plant" (line driver 160, conductor pair 144). The plant has a physical layer quality that is sensed by physical layer quality sensor 212 in order to provide the sensed quality output 252 as feedback to the "summing junction" (comparator 216) of the control system 250.

The control system 250 controls a physical layer quality of user data transmitted from a first end 152 of a serial bus 144 to a second end 202 of the serial bus 144. The control system 250 comprises a first line driver 160 transmitting user data and primitives at the first end 152. The first line driver 160 has a control input 166 that controls the physical layer quality at the first end 152. A physical layer quality sensor 212 senses the physical layer quality at the second end 202 and generates a sensed quality output, also called feedback 252. The control system 250 comprises a quality standard 214, and a comparator 216 receiving the quality standard 214 and the sensed quality output 252. The comparator 216 generates control primitives 158 representative of a difference between the quality standard 214 and the sensed quality output 252.

The control system 250 comprises a second line driver 212. The second line driver 212 at the second end 202 of the serial bus 142 transmits the control primitives 158 at the second end. A first line receiver 154 at the first end 152 receives the control primitives 158.

A controller 168 coupled to the first line receiver 154 generates a control output 170 as a function of the control primitives 158. The control output 170 is fed forward to the control input 166 to provide closed loop control of the physical layer quality.

The control system 250 illustrated in FIG. 3 can be adapted for use with various communication protocols in varied applications. Primitives can be encoded using 8B/10B encoding systems starting with the character "K" and including 4 bytes as defined in the serial ATA protocol, or other primitive encoding arrangements can be used, depending on the particulars of the protocol. The arrangements shown in FIGS. 2A-2B, 3 can be combined with the arrangements shown in U.S. Pat. No. 6,380,873 Priborsky et al., the contents of which are hereby incorporated by reference, to reduce electromagnetic interference (EMI). The control provided by control system 250 is explained in more detail below in connection with time domain waveforms illustrated in FIG. 4.

Figure 4:
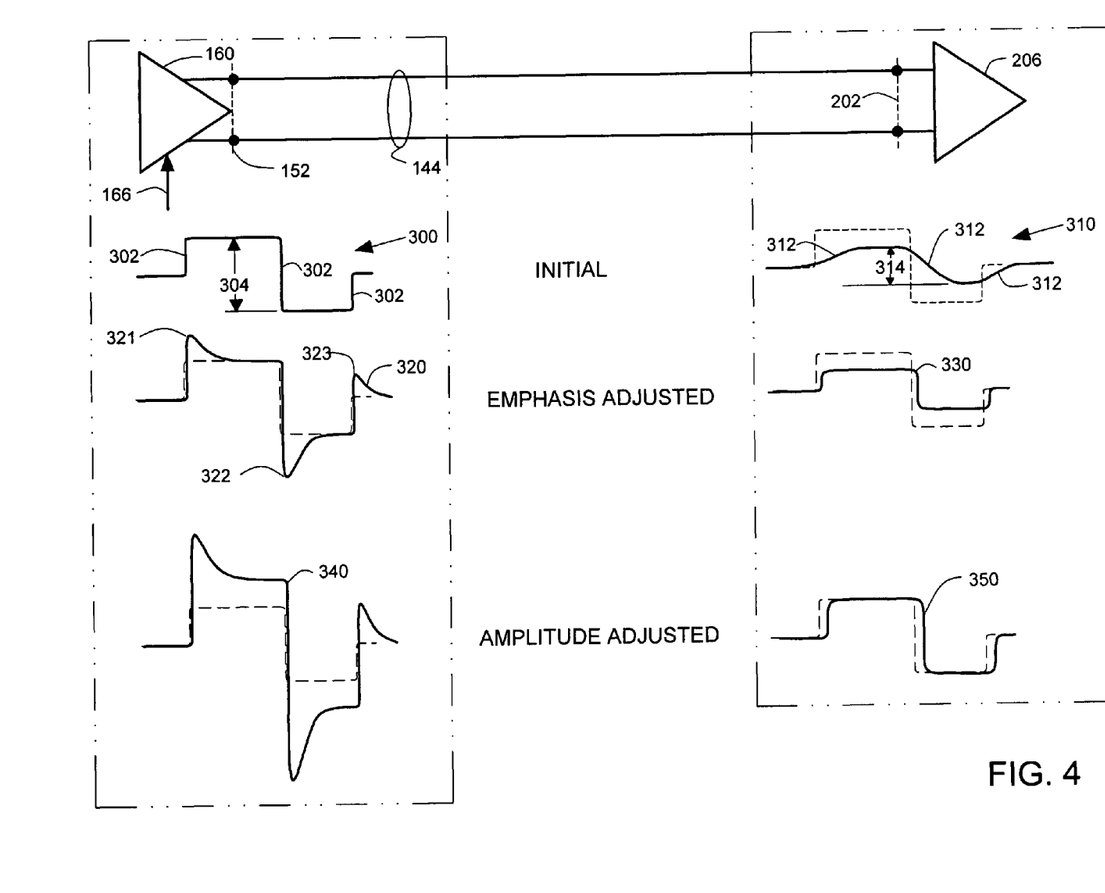
FIG. 4 illustrates physical layer qualities of transmitted and received data.

FIG. 4 schematically illustrates physical layer qualities of transmitted and received data. At the top of FIG. 4, the line driver 160 couples to end 152 of a serial bus 144, and the line receiver 206 couples to the end 202 of the serial bus 144. Time domain waveforms 300, 320, 340 represent transmitted signals at the first end 152. Time domain waveforms 310, 330, 350 represent received signals a the second end 202. The transmitted waveform is adapted in successive steps shown sequentially in waveforms 300, 320, 340.

At an initial condition or startup, the line driver 160 produces a waveform 300 at the first end 152 that essentially comprises a pulse stream of data with sharp, well-defined edges 302 and a nominal amplitude 304 that provides good noise margins in the context of the logic levels of the physical layer of the channel communication protocol. At the opposite end 202 of the serial bus, however, a distorted waveform 310 is received by the line receiver 206. The waveform 310 has poorly defined edges 312 and a low amplitude 314. The waveform 310 is superimposed on a the waveform 300 (in dashed line) for comparison. The distortion can be attributable to excessive capacitive loading from the bus 144, connectors or many other physical layer anomalies.

As explained above in connection with FIG. 3, the physical quality sensor 212 senses the distortion in waveform 310 and feeds back the distortion to a quality compare circuit 216 that causes the control system 250 to adjust the control input 166 (FIG. 4) to reduce the distortion. After such adjustment (or a series of multiple incremental adjustments), the line driver 160 generates the waveform 320. The waveform 320 has increased high frequency content (pre-emphasis as seen at 321, 322, 323) such that the received waveform 330 comprises a pulse stream of data with sharp, well-defined edges. The control system 250 has thus corrected a physical layer quality to reduce distortion. Ideally, an approximation of a rectangular waveform is expected to be received, and the difference between the actual waveform and the expected rectangular waveform is seen as distortion.

As illustrated at waveform 340, The control system 250 sensed that the amplitude of waveform 330 is too low and increases the amplitude of the transmitted pulse stream without changing its overall shape. The amplitude of the received waveform 350 returned to substantially the same nominal amplitude as waveform 300. The control system 250 has thus corrected a physical layer quality to control amplitude. While the adjustments shown in FIG. 3 are shown as single step adjustments, it will be understood by those skilled in the art that the adjustments can be made incrementally over a short period of time. When there is a large step change indicated, adjustments in small increments rather than a large step are preferred in order to avoid noise and disturbances on the serial bus.

FIG. 5A illustrates a first transceiver 450 that controls a physical layer quality of transmitted data 162 and that also senses a physical layer quality of received user data or control primitives 158. FIG. 5B illustrates a second transceiver 454 that controls a physical layer quality of transmitted data 156 and that also senses a physical layer quality of received user data or control primitives 452. FIGS. 5A-5B are best understood when the bottom edge of FIG. 5A is aligned with the top edge of FIG. 5B to form a block diagram of two transceivers 450, 454 connected by a serial bus 140. The transceiver 450 in FIG. 5A has a structure that is substantially identical to a structure of transceiver 454 in FIG. 5B. Both transceivers 450, 454 are able to sense physical layer quality of received signals, and both transceivers 450, 454 are able to control a physical layer quality of transmitted signals. When transceivers 450, 454 are coupled together, there are two control systems such as the one shown in FIG. 3 that are in operation simultaneously, controlling physical layer quality of transmission in two opposite directions of a full duplex communication channel.

FIGS. 5A-5B are similar to FIGS. 2A-2B, except that FIGS. 5A-5B show a duplex control arrangement in which communications in both directions are adjusted by control systems to control physical layer quality for each of the two directions of transmission. Reference numbers used in FIGS. 5A-5B that are the same as reference numbers used in FIGS. 2A-2B identify the same or similar features. Reference numbers used in FIGS. 5A-5B that have a suffix "A" but are otherwise the same an un-suffixed reference numbers in FIGS. 2A-2B identify similar features, but the reference number with an "A" suffix operates in a direction of transmission that is opposite the direction of transmission shown in FIGS. 2A-2B. In FIG. 5A, since there are control primitives 158, 452 going in both directions, and there is no need to rely on primitives 164 as shown in FIG. 2A.

The present transceiver 450 shown in FIG. 5A is "backwards compatible" in the sense that if one of the transceivers 450 is connected to an older transceiver that does not include the physical layer quality sensing and control features, the present transceiver 450 will be able to operate with received sync primitives (such as the sync primitives 164 shown in FIGS. 2A-2B) rather than control primitives 158 in order to provide control of physical layer quality of the transmitted signal from the present transceiver in a single direction on the serial bus 140.

In summary, a control system (such as 250) controls a physical layer quality of user data (such as 162) transmitted between first and second ends (such as 152, 202) of a serial bus (such as 140). The control system comprises a first line driver (such as 160) that transmits the user data and primitives (such as 164) at the first end. The first line driver has a control input (such as 166) that controls the physical layer quality at the first end.

A physical layer quality sensor (such as 212) senses the physical layer quality at the second end and generates a sensed quality output (such as 252). A comparator (such as comparator 216) compares the sensed quality output to a quality standard (such as 214). The comparator generates control primitives (such as 158) representative of a difference between the quality standard and the sensed quality output.

A second line driver (such as 208) at the second end of the serial bus transmits the control primitives at the second end. A first line receiver (such as 154) at the first end receives the control primitives. A controller (such as 168) couples to the first line receiver and generates a control output (such as 170) as a function of the control primitives. The control output feeds back to the control input to provide closed loop control of the physical layer quality.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular communication channel controlled by the control system while maintaining substantially the same functionality without departing from the scope and spirit of the present invention. In addition, although the preferred embodiment described herein is directed to a communication channel for a computer system, it will be appreciated by those skilled in the art that the teachings of the present invention can be applied to a variety of communication channels, without departing from the scope of the present invention.

What is claimed is:

1. An apparatus, comprising:
    a first line receiver coupled to receive first physical layer quality data; and
    a first line driver coupled to transmit control data that includes an adjustable pre-emphasis and that has a response to the first physical layer quality data, the control data comprises data indicating a comparison of the received first physical layer quality data to a quality standard, the first physical layer quality data and the quality standard are independent of any synchronization data.

2. The apparatus of claim 1 wherein the first physical layer quality data is sensed in real time.

3. The apparatus of claim 1 wherein the first physical layer quality data is dynamically calibrated.

4. The apparatus of claim 1 wherein the first physical layer quality data includes amplitude.

5. The apparatus of claim 1 wherein the apparatus is mounted in a storage device, and the apparatus couples the storage device to a host computer system.

6. The apparatus of claim 1 wherein the apparatus is mounted in a host computer system, and the apparatus couples the host computer system to a storage device.

7. The apparatus of claim 1 wherein the apparatus couples to a serial bus that comprises two pairs of conductors.

8. An apparatus, comprising:
    a line receiver coupled to receive physical layer quality data; and a line driver coupled to transmit control data that includes an indication of frequency rolloff and that is responsive to the physical layer quality data that is independent of any synchronization data;

a quality sensing circuit that comprises:
a physical layer quality sensor sensing a received first signal;
a quality standard; and
a quality compare circuit comparing the received first signal to the quality standard and providing the control data.

9. The apparatus of claim 8 wherein the control data is generated in real time.

10. The apparatus of claim 8 wherein the physical layer quality data include an indication of amplitude.

11. The apparatus of claim 8 wherein the line receiver is mounted in a storage device and couples the storage device to a host computer system.

12. The apparatus of claim 8 wherein the line receiver is mounted in a host computer system and couples the host computer system to a storage device.

13. The apparatus of claim 8 wherein the line receiver and line driver couple to a serial bus that comprises two pairs of conductors.

14. A system, comprising:
a first apparatus comprising:
a first line driver transmitting user data and primitives at a first end of a serial bus, the first line driver having a control input that controls a transmitted physical layer quality at the first end;
a quality sensing circuit, at a second end of the serial bus, that makes a comparison of a quality standard to a received physical layer quality that includes an amplitude, and that generates control primitives representative of the comparison; and
a second line driver at the second end of the serial bus transmitting the generated control primitives at the second end, and a first line receiver at the first end receiving the control primitives to provide closed loop control of the physical layer quality; and a second apparatus, substantially the same as the first apparatus, the second apparatus controlling a second physical layer quality in a direction on the serial bus that is opposite to the direction of control of the first apparatus, to provide bi-directional physical layer quality control on the serial bus.

15. The apparatus of claim 14 wherein the serial bus comprises two pairs of conductors.

16. The apparatus of claim 14 wherein the serial bus carries user data between a first functional device and a second functional device.

17. The apparatus of claim 16 wherein the first functional device is a storage device and the second functional device is a host computer system.

18. The method of claim 14 wherein the received physical layer quality further comprises a frequency rolloff.

* * * * *